US009602004B2

(12) United States Patent
Deng (10) Patent No.: US 9,602,004 B2
(45) Date of Patent: Mar. 21, 2017

(54) EFFICIENT CONTROL CIRCUIT FOR BUCK-BOOST CONVERTERS AND CONTROL METHOD THEREOF

(71) Applicant: Chengdu Monolithic Power Systems Co., Ltd., Chengdu (CN)

(72) Inventor: Chenggang Deng, Chengdu (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 172 days.

(21) Appl. No.: 14/222,509

(22) Filed: Mar. 21, 2014

(65) Prior Publication Data

US 2014/0285170 A1     Sep. 25, 2014

(30) Foreign Application Priority Data

Mar. 22, 2013   (CN) .......................... 2013 1 0093795

(51) Int. Cl.
*H02M 3/158*     (2006.01)
*H02M 3/156*     (2006.01)
*H02M 1/00*      (2006.01)

(52) U.S. Cl.
CPC ......... *H02M 3/1582* (2013.01); *H02M 3/156* (2013.01); *H02M 2001/0003* (2013.01)

(58) Field of Classification Search
CPC .................................................. H02M 3/158
USPC ................................ 323/283, 284, 282, 259
See application file for complete search history.

(56) References Cited

U.S. PATENT DOCUMENTS

| | | | | |
|---|---|---|---|---|
| 2008/0001587 A1* | 1/2008 | Cremoux | ............ | H02M 3/1582 323/282 |
| 2010/0308654 A1* | 12/2010 | Chen | ................... | H02M 3/1584 307/31 |
| 2011/0227550 A1* | 9/2011 | Walters | ............... | H02M 3/1582 323/283 |
| 2012/0049810 A1* | 3/2012 | Huang | ...................... | G05F 1/46 323/271 |
| 2012/0105038 A1* | 5/2012 | Chen | ................... | H02M 3/1582 323/283 |
| 2012/0146594 A1* | 6/2012 | Kobayashi | .......... | H02M 3/1582 323/234 |
| 2013/0106374 A1* | 5/2013 | Ball | .................... | H02M 3/1588 323/271 |

* cited by examiner

*Primary Examiner* — Matthew Nguyen
*Assistant Examiner* — Trinh Dang

(57) ABSTRACT

A controller used in a buck-boost converter includes a logic control circuit, a pulse width increasing circuit, a pulse width decreasing circuit, a first driving circuit and a second driving circuit. The pulse width increasing circuit generates a sum control signal based on a logic control signal generated by the logic control circuit. The pulse width increasing circuit increases the pulse width of the logic control signal by a first value to generate the pulse width of the sum control signal. The pulse width decreasing circuit generates a difference control signal based on the logic control signal. The pulse width decreasing circuit decreases the pulse width of the logic control signal by a second value to generate the pulse width of the difference control signal. The first and second driving circuit respectively generates driving signals based on the sum control signal and the difference control signal.

16 Claims, 6 Drawing Sheets

EFFICIENT CONTROL CIRCUIT FOR BUCK-BOOST CONVERTERS AND CONTROL METHOD THEREOF

CROSS-REFERENCE TO RELATED APPLICATIONS

This application claims the benefit of CN application 201310093795.0, filed on Mar. 22, 2013, and incorporated herein by reference.

TECHNICAL FIELD

The present invention generally relates to electronic circuits, and more particularly but not exclusively to control circuits for buck-boost converters and control methods thereof.

BACKGROUND

Nowadays, portable electronic products become smaller and lighter, which has accordingly decreased the volume and capacity of their batteries. As a result, the efficiency of power supply modules needs to be improved. Furthermore, the power supply modules need to provide a stable output voltage when the battery voltage varies in a wide range, so as to improve the endurance of the batteries. Buck-boost converters which can work in a wide input range are widely used in these applications.

Figure 1:
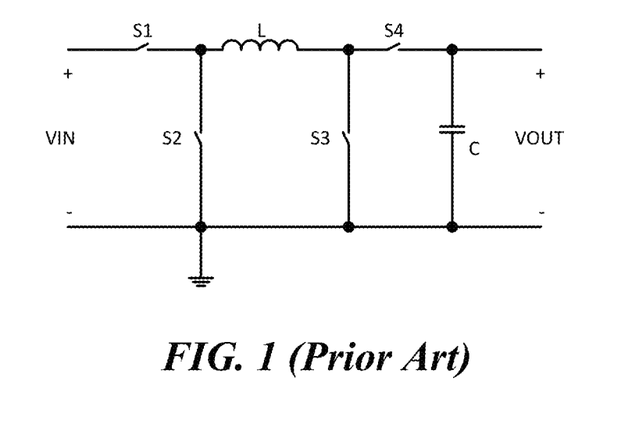
FIG. 1 illustrates a traditional buck-boost converter with four switches.

FIG. 1 illustrates a traditional buck-boost converter with four switches. The buck-boost converter converts an input voltage VIN into an output voltage VOUT. It comprises switches S1~S4, an inductor L and an output capacitor C. Energy is stored in the inductor L when the switches S1, S3 are turned on and the switches S2, S4 are turned off. The energy stored in the inductor L is provided to a load when the switches S1, S3 are turned off and the switches S2, S4 are turned on. Since the switches S1~S4 keep switching during the operation, the power loss of the traditional buck-boost converter is large.

To reduce the power loss, different working modes may be utilized according to the relationship between the input voltage VIN and the output voltage VOUT. When the input voltage VIN is smaller than the output voltage VOUT, the buck-boost converter works in a BOOST mode. The switch S1 is maintained on and the switch S2 is maintained off. The switches S3 and S4 are controlled through pulse width modulation. When the input voltage VIN is larger than the output voltage VOUT, the buck-boost converter works in a BUCK mode. The switch S4 is maintained on and the switch S3 is maintained off. The switches S1 and S2 are controlled through pulse width modulation.

In the method mentioned above, since the working mode is determined by the relationship between the input voltage and the output voltage, the relationship between the control loop and the feedback loop is complicated, which brings difficulties to system design and test. Furthermore, circuit parameters (such as voltage, current and duty cycle) suffer from sudden changes during the mode transition, which may induce spike on the output voltage.

SUMMARY

Embodiments of the present invention are directed to a controller used in a buck-boost converter, wherein the buck-boost converter converting an input voltage into an output voltage comprises a first switch, a second switch, a third switch, a fourth switch and an inductor. The controller comprises a logic control circuit, a pulse width increasing circuit, a pulse width decreasing circuit, a first driving circuit and a second driving circuit. The logic control circuit is configured to generate a logic control signal based on a reference signal and a feedback signal representative of the output voltage. The pulse width increasing circuit is coupled to the logic control circuit, wherein the pulse width increasing circuit is configured to generate a sum control signal based on the logic control signal. The pulse width increasing circuit increases the pulse width of the logic control signal by a first predetermined value to generate the pulse width of the sum control signal. The pulse width decreasing circuit is coupled to the logic control circuit, wherein the pulse width decreasing circuit is configured to generate a difference control signal based on the logic control signal. The pulse width decreasing circuit decreases the pulse width of the logic control signal by a second predetermined value to generate the pulse width of the difference control signal. The first driving circuit is coupled to the pulse width increasing circuit, wherein based on the sum control signal, the first driving circuit generates a first driving signal and a second driving signal to respectively control the first switch and the second switch. The second driving circuit is coupled to the pulse width decreasing circuit, wherein based on the difference control signal, the second driving circuit generates a third driving signal and a fourth driving signal to respectively control the third switch and the fourth switch.

Embodiments of the present invention are also directed to a control method of a buck-boost converter, wherein the buck-boost converter converting an input voltage into an output voltage comprises a first switch, a second switch, a third switch, a fourth switch and an inductor. The control method comprises: sensing the output voltage and generating a feedback signal representative of the output voltage; generating a logic control signal based on a reference signal and the feedback signal; generating a sum control signal based on the logic control signal, wherein the pulse width of the sum control signal is equal to the sum of a first predetermined value and the pulse width of the logic control signal; generating a difference control signal based on the logic control signal, wherein the pulse width of the difference control signal is equal to the difference between the pulse width of the logic control signal and a second predetermined value; generating a first driving signal and a second driving signal based on the sum control signal to respectively control the first switch and the second switch; generating a third driving signal and a fourth driving signal based on the difference control signal to respectively control the third switch and the fourth switch.

In the embodiments of the present invention, the buck-boost converter automatically and smoothly switches among different modes based on the pulse width of the logic control signal. Circuit parameters (such as voltage, current and duty cycle) are continuous and smooth during the mode transition. System design and test also become easier. Moreover, since the buck-boost converter does not need extra input voltage feedback circuit or mode detection circuit, the volume and cost of the system is decreased. The reliability of the system is enhanced, too.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
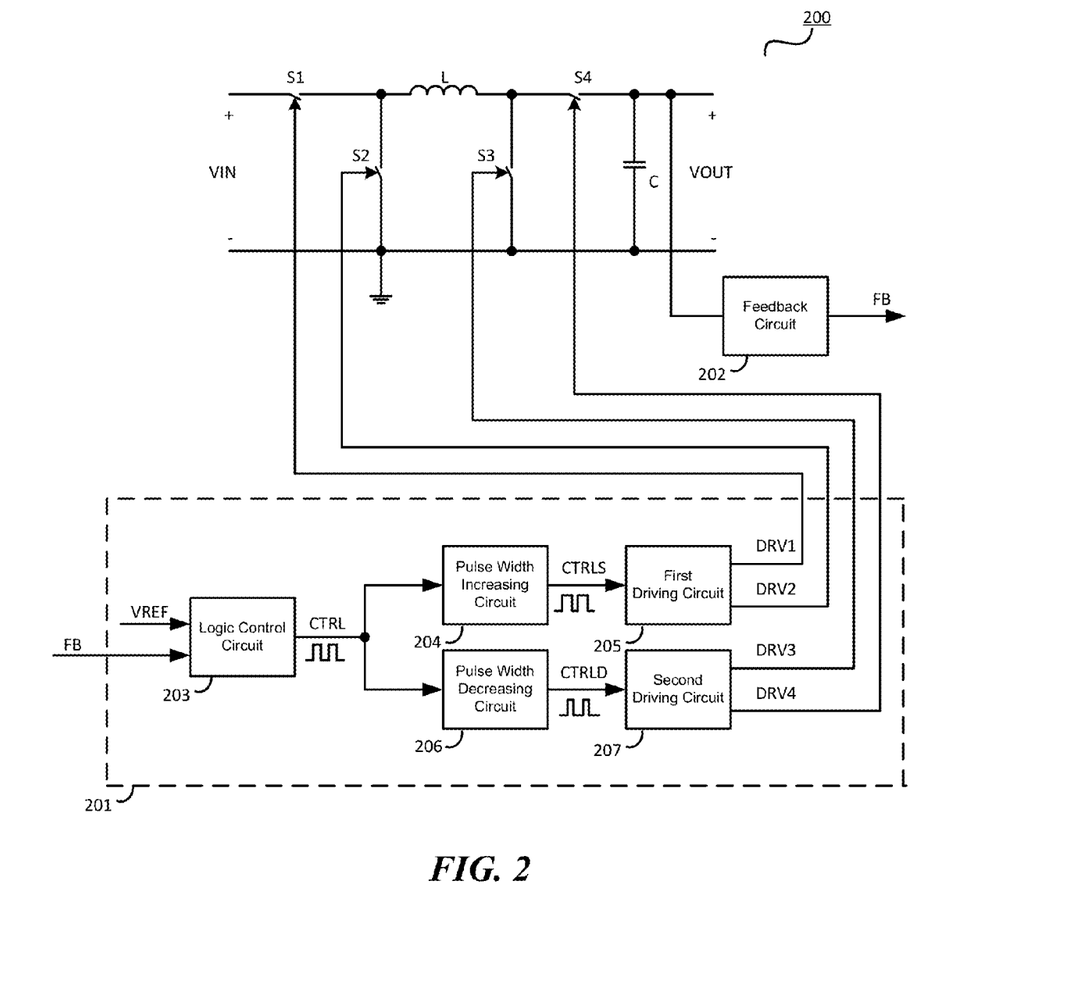
FIG. 2 is a block diagram of a buck-boost converter 200 in accordance with an embodiment of the present invention.

FIG. 2 is a block diagram of a buck-boost converter 200 in accordance with an embodiment of the present invention. The buck-boost converter 200 comprises switches S1~S4, an inductor L, an output capacitor C, a controller 201 and a feedback circuit 202. The switch S1 has a first terminal, a second terminal and a control terminal, wherein the first terminal is configured to receive an input voltage VIN. The switch S2 has a first terminal, a second terminal and a control terminal, wherein the first terminal is coupled to the second terminal of the switch S1, the second terminal is grounded. The inductor L has a first terminal and a second terminal, wherein the first terminal is coupled to the second terminal of the switch S1 and the first terminal of the switch S2. The switch S3 has a first terminal, a second terminal and a control terminal, wherein the first terminal is coupled to the second terminal of the inductor L, the second terminal is grounded. The switch S4 has a first terminal, a second terminal and a control terminal, wherein the first terminal is coupled to the second terminal of the inductor L and the first terminal of the switch S3, the second terminal is configured to provide an output voltage VOUT. The output capacitor C is coupled between the second terminal of the switch S4 and the reference ground. The switches S1~S4 may be any controllable semiconductor devices, such as MOSFETs, BJTs, IGBTs and so on.

The feedback circuit 202 is coupled to the second terminal of the switch S4. It senses the output voltage VOUT and generates a feedback signal FB representative of the output voltage. The controller 201 is coupled to the feedback circuit 202 to receive the feedback signal FB. Based on the feedback signal FB, the controller 201 generates driving signals DRV1~DRV4 to respectively control the switches S1~S4. The controller 201 may be an integrated circuit, or be partially or fully composed of discrete electronic components.

As shown in FIG. 2, the controller 201 comprises a logic control circuit 203, a pulse width increasing circuit 204, a pulse width decreasing circuit 206, a first driving circuit 205 and a second driving circuit 207. The logic control circuit 203 is coupled to the feedback circuit 202 to receive the feedback signal FB, and is configured to generate a logic control signal CTRL based on a reference signal VREF and the feedback signal FB. The logic control circuit 203 may utilize any suitable control method, such as fixed frequency peak current control, average current control, off time control and so on.

The pulse width increasing circuit 204 is coupled to the logic control circuit 203 to receive the logic control signal CTRL, and is configured to generate a sum control signal CTRLS based on the logic control signal CTRL. The pulse width increasing circuit 204 adds the pulse width TON of the logic control signal CTRL to a first predetermined value TTH1 to generate the pulse width TONS of the sum control signal CTRLS. The pulse width increasing circuit 204 may be any analog or digital circuit which can increase the pulse width. Since the pulse width TONS of the sum control signal CTRLS should be larger than or equal to zero, and smaller than or equal to the period T of the logic control signal CTRL, the pulse width TONS of the sum control signal CTRLS is limited to T when TON+TTH1 is larger than T.

The first driving circuit 205 is coupled to the pulse width increasing circuit 204 to receive the sum control signal CTRLS. Based on the sum control signal CTRLS, the first driving circuit 205 generates driving signals DRV1 and DRV2 to respectively control the switches S1 and S2. The driving signals DRV1 and DRV2 are generally complementary. To prevent shoot through, the first driving circuit 205 may comprise a dead time control circuit to induce dead time between the driving signals DRV1 and DRV2.

The pulse width decreasing circuit 206 is coupled to the logic control circuit 203 to receive the logic control circuit CTRL, and is configured to generate a difference control signal CTRLD based on the logic control signal CTRL. The pulse width decreasing circuit 206 subtracts a second predetermined value TTH2 from the pulse width TON of the logic control signal CTRL to generate the pulse width TOND of the difference control signal CTRLD. The pulse width decreasing circuit 206 may be any analog or digital circuit which can decrease the pulse width. Since the pulse width TOND of the difference control signal CTRLD should be larger than or equal to zero, and smaller than or equal to the period T of the logic control signal CTRL, the pulse width TOND of the difference control signal CTRLD is limited to zero when TON−TTH2 is smaller than zero.

The second driving circuit 207 is coupled to the pulse width decreasing circuit 206 to receive the difference control signal CTRLD. Based on the difference control signal CTRLD, the second driving circuit 207 generates driving signals DRV3 and DRV4 to respectively control the switches S3 and S4. The driving signals DRV3 and DRV4 are generally complementary. To prevent shoot through, the second driving circuit 207 may comprise a dead time control circuit to induce dead time between the driving signals DRV3 and DRV4.

A buck-boost converter working in CCM (continuous current mode) will be analyzed below as an example. However, persons skilled in the art can recognize that, similar analysis may also be applicable to buck-boost converters working in DCM (discontinuous current mode).

When the pulse width TON of the logic control signal CTRL is larger than TTH2 and smaller than T−TTH1, which means TTH2<TON<(T−TTH1), the pulse width TONS of the sum control signal CTRLS is TON+TTH1, and the pulse width TOND of the difference control signal CTRLD is TON−TTH2. The buck-boost converter 200 works in BUCK-BOOST mode, the switches S1~S4 all keep switching during the operation. According to the voltage-second balance law, we can get:

$$VIN*(TON+TTH1)/T=VOUT*(1-(TON-TTH2)/T)$$

When TON≤TTH2, the pulse width TONS of the sum control signal CTRLS is TON+TTH1, and the pulse width TOND of the difference control signal CTRLD is limited to zero. The buck-boost converter 200 works in BUCK mode, the switch S3 is maintained off and the switch S4 is maintained on. According to the voltage-second balance law, we can get:

$$VIN*(TON+TTH1)/T=VOUT$$

When TOM(T−TTH1), the pulse width TONS of the sum control signal CTRLS is limited to T, and the pulse width TOND of the difference control signal CTRLD is TON−TTH2. The buck-boost converter 200 works in BOOST mode, the switch S1 is maintained on and the switch S2 is maintained off. According to the voltage-second balance law, we can get:

$$VIN=VOUT*(1-(TON-TTH2)/T)$$

Based on the pulse width TON of the logic control signal CTRL, the buck-boost converter 200 can automatically and smoothly switch among the BUCK mode, BOOST mode and BUCK-BOOST mode. Circuit parameters (such as voltage, current and duty cycle) are continuous and smooth during the mode transition. System design and test also become easier. Moreover, since the buck-boost converter 200 does not need extra input voltage feedback circuit or mode detection circuit, the volume and cost of the system is decreased. The reliability of the system is enhanced, too.

Tradeoff between efficiency and smooth mode transition should be considered when the first predetermined value TTH1 and the second predetermined value TTH2 are selected. The larger the TTH1 and TTH2, the higher the efficiency. The smaller the TTH1 and TTH2, the smoother the mode transition. Generally, TTH1 and TTH2 are both larger than zero, and the sum of them is smaller than the period T of the logic control signal CTRL. In an embodiment, TTH1 is equal to TTH2 to facilitate the system design.

Figure 3:
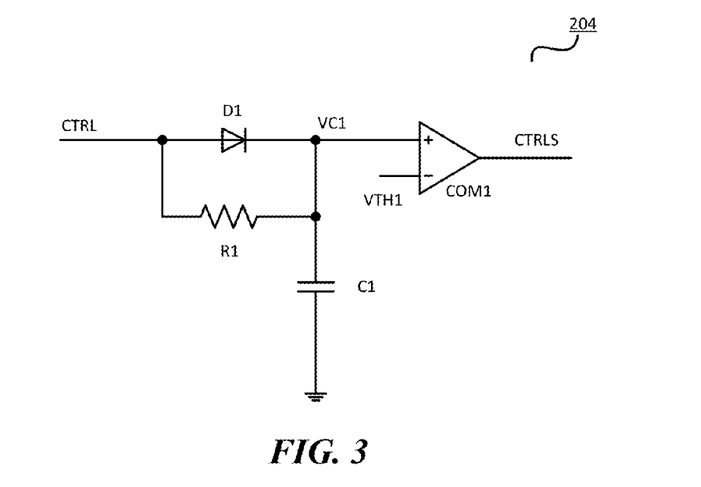
FIG. 3 schematically illustrates the pulse width increasing circuit 204 shown in FIG. 2 in accordance with an embodiment of the present invention.

FIG. 3 schematically illustrates the pulse width increasing circuit 204 shown in FIG. 2 in accordance with an embodiment of the present invention. The pulse width increasing circuit 204 comprises a diode D1, a resistor R1, a capacitor C1 and a comparator COM1. The diode D1 has an anode and a cathode, wherein the anode is coupled to the logic control circuit to receive the logic control signal CTRL. The resistor R1 has a first terminal and a second terminal, wherein the first terminal is coupled to the anode of the diode D1, the second terminal is coupled to the cathode of the diode D1. The capacitor C1 has a first terminal and a second terminal, wherein the first terminal is coupled to the cathode of the diode D1, the second terminal is grounded. The comparator COM1 has a non-inverting input terminal, an inverting input terminal and an output terminal, wherein the non-inverting terminal is coupled to the first terminal of the capacitor C1, the inverting input terminal is configured to receive a threshold voltage VTH1. The comparator COM1 compares the voltage VC1 across the capacitor C1 with the threshold voltage VTH1 and generates the sum control signal CTRLS at the output terminal.

Figure 4:
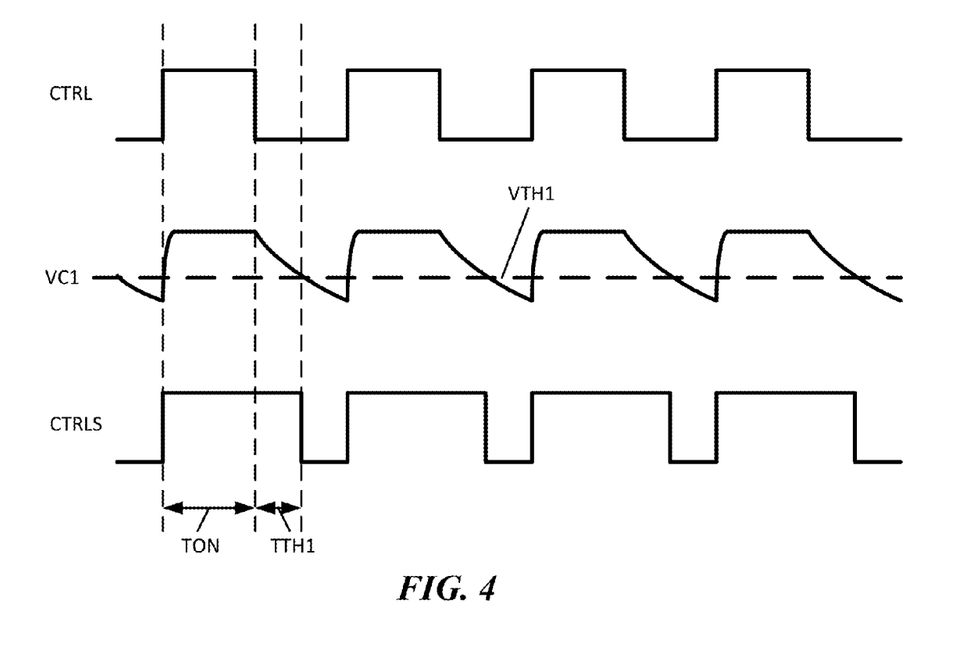
FIG. 4 illustrates the working waveforms of the pulse width increasing circuit 204 shown in FIG. 3 in accordance with an embodiment of the present invention.

FIG. 4 illustrates the working waveforms of the pulse width increasing circuit 204 shown in FIG. 3 in accordance with an embodiment of the present invention. As shown in FIG. 4, the diode D1 is turned on when the logic control signal CTRL is changed from logical low into logical high. The capacitor C1 is charged through the diode D1, and the voltage VC1 across the capacitor C1 is increased rapidly. When the voltage VC1 is increased to reach the threshold voltage VTH1, the sum control signal CTRLS is changed from logical low into logical high. When the logic control signal CTRL is changed from logical high into logical low, the diode D1 is turned off and the capacitor C1 is discharged through the resistor R1. The voltage VC1 is gradually decreased. When the voltage VC1 is decreased to reach the threshold voltage VTH1, the sum control signal CTRLS is changed from logical high into logical low. The discharge time of the capacitor C1 until the voltage VC1 reaches the threshold voltage VTH1 is the first predetermined value TTH1. It can be adjusted through changing the threshold voltage VTH1, the resistance of the resistor R1 or the capacitance of the capacitor C1.

Figure 5:
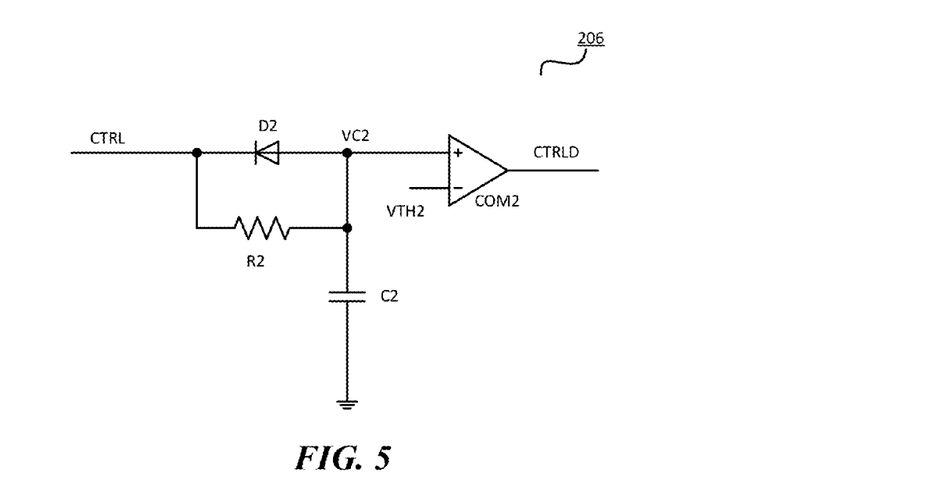
FIG. 5 schematically illustrates the pulse width decreasing circuit 206 shown in FIG. 2 in accordance with an embodiment of the present invention.

FIG. 5 schematically illustrates the pulse width decreasing circuit 206 shown in FIG. 2 in accordance with an embodiment of the present invention. The pulse width increasing circuit 206 comprises a diode D2, a resistor R2, a capacitor C2 and a comparator COM2. The diode D2 has an anode and a cathode, wherein the cathode is coupled to the logic control circuit to receive the logic control signal CTRL. The resistor R2 has a first terminal and a second terminal, wherein the first terminal is coupled to the cathode of the diode D2, the second terminal is coupled to the anode of the diode D2. The capacitor C2 has a first terminal and a second terminal, wherein the first terminal is coupled to the anode of the diode D2, the second terminal is grounded. The comparator COM2 has a non-inverting input terminal, an inverting input terminal and an output terminal, wherein the non-inverting terminal is coupled to the first terminal of the capacitor C2, the inverting input terminal is configured to receive a threshold voltage VTH2. The comparator COM2 compares the voltage VC2 across the capacitor C2 with the threshold voltage VTH2 and generates the difference control signal CTRLD at the output terminal.

Figure 6:
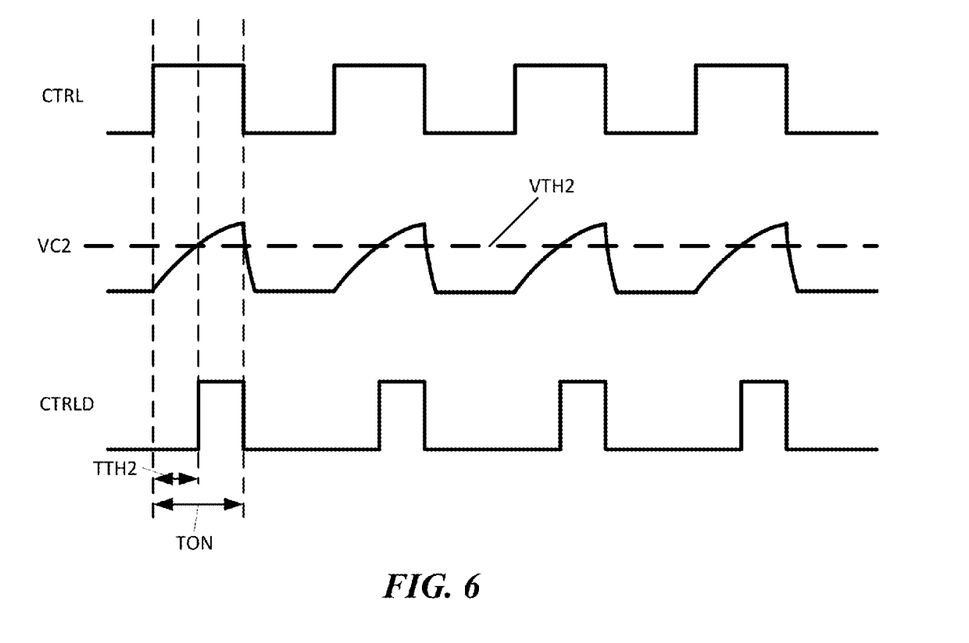
FIG. 6 illustrates the working waveforms of the pulse width decreasing circuit 206 shown in FIG. 5 in accordance with an embodiment of the present invention.

FIG. 6 illustrates the working waveforms of the pulse width decreasing circuit 206 shown in FIG. 5 in accordance with an embodiment of the present invention. As shown in FIG. 6, the diode D2 is turned off when the logic control signal CTRL is changed from logical low into logical high. The capacitor C2 is charged through the resistor R2, and the voltage VC2 across the capacitor C2 is gradually increased. When the voltage VC2 is increased to reach the threshold voltage VTH2, the difference control signal CTRLD is changed from logical low into logical high. When the logic control signal CTRL is changed from logical high into logical low, the diode D2 is turned on and the capacitor C2 is discharged through the diode D2. The voltage VC2 is decreased rapidly. When the voltage VC2 is decreased to reach the threshold voltage VTH2, the difference control signal CTRLD is changed from logical high into logical low. The charge time of the capacitor C2 until the voltage VC2 reaches the threshold voltage VTH2 is the second predetermined value TTH2. It can be adjusted through changing the threshold voltage VTH2, the resistance of the resistor R2 or the capacitance of the capacitor C2.

Figure 7:
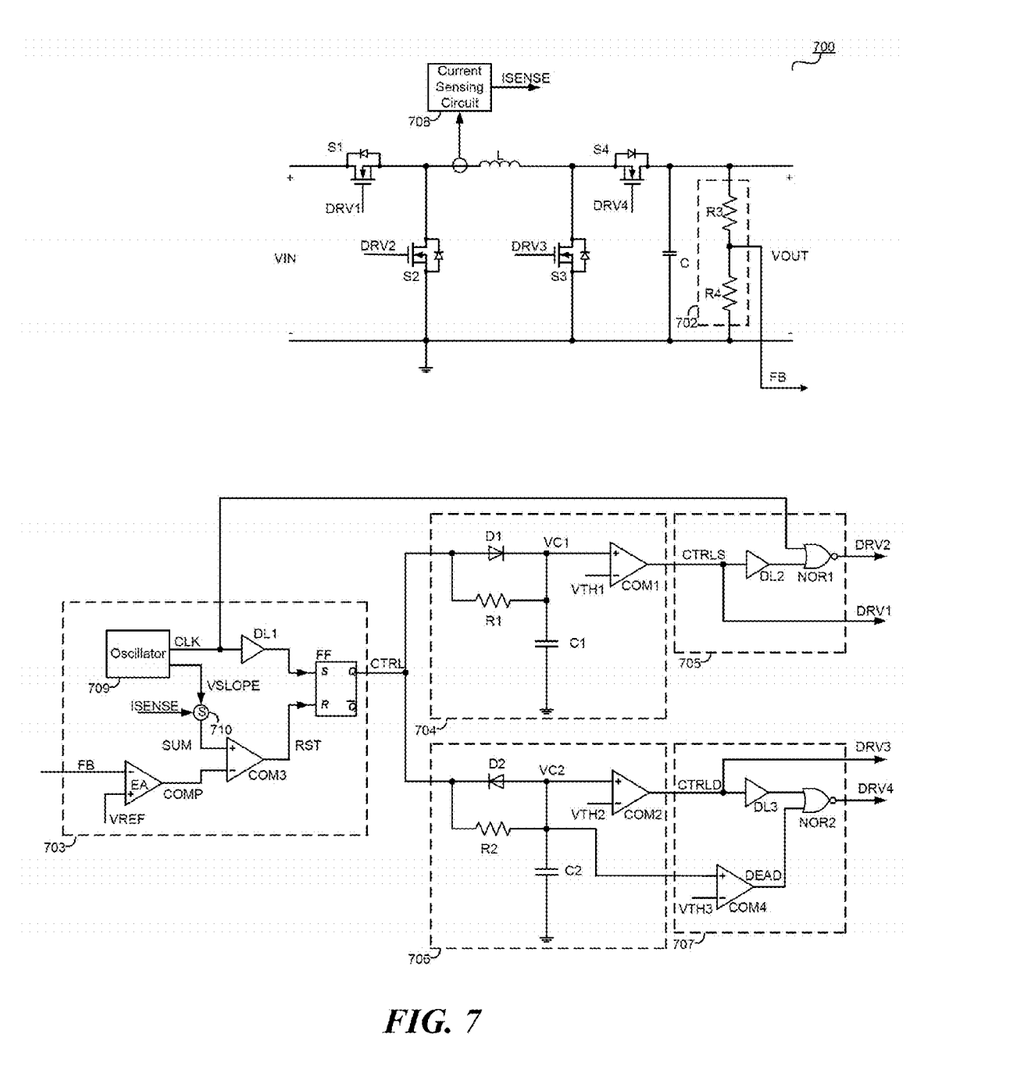
FIG. 7 schematically illustrates a buck-boost converter 700 in accordance with an embodiment of the present invention.

FIG. 7 schematically illustrates a buck-boost converter 700 in accordance with an embodiment of the present invention. Compared with the embodiment shown in FIG. 2, the buck-boost converter 700 further comprises a current sensing circuit 708. The current sensing circuit 708 senses the current flowing through the inductor L and generates a current sensing signal ISENSE. The current sensing circuit 708 may comprise current sensing resistor, current sensor or current mirror, etc. The current sensing circuit 708 may directly sense the current flowing through the inductor L. It may also sense the current flowing through the switch S1 to get the current sensing signal ISENSE.

The feedback signal 702 comprises a resistor divider consisting of resistors R3 and R4. The logic control circuit 703 comprises an oscillator 709, an error amplifier EA, an adder 710, a comparator COM3 and a RS flip-flop FF. The oscillator 709 is configured to periodically generate a clock signal CLK and a ramp signal VSLOPE. The error amplifier EA has a non-inverting input terminal, an inverting input terminal and an output terminal, wherein the non-inverting input terminal is configured to receive the reference signal VREF, the inverting input terminal is coupled to the feedback circuit 702 to receive the feedback signal FB. Based on the reference signal VREF and the feedback signal FB, the error amplifier EA generates a compensation signal COMP at the output terminal. The adder 710 has a first input terminal, a second input terminal and an output terminal, wherein the first input terminal is coupled to the oscillator 709 to receive the ramp signal VSLOPE, the second input terminal is coupled to the current sensing circuit 708 to receive the current sensing signal ISENSE. The adder 710 adds the ramp signal VSLOPE to the current sensing signal ISENSE and generates a sum signal SUM at the output terminal.

The comparator COM3 has a non-inverting input terminal, an inverting input terminal and an output terminal, wherein the non-inverting input terminal is coupled to the output terminal of the adder 710 to receive the sum signal SUM, the inverting input terminal is coupled to the output terminal of the error amplifier EA to receive the compensation signal COMP. The comparator COM3 compares the sum signal SUM with the compensation signal COMP and generates a reset signal RST at the output terminal. The flip-flop FF has a set terminal, a reset terminal and an output terminal, wherein the set terminal is coupled to the oscillator 709 to receive the clock signal CLK, the reset terminal is coupled to the output terminal of the comparator COM3 to receive the reset signal RST. Based on the clock signal CLK and the reset signal RST, the flip-flop FF generates the logic control signal CTRL at the output terminal.

The logic control circuit shown in FIG. 7 utilizes a fixed frequency peak current control method. At the rising edge of the clock signal CLK, the flip-flop FF is set and the logic control signal CTRL is changed from logical low into logical high. When the sum signal SUM is increased to be larger than the compensation signal COMP, the reset signal RST is changed from logical low into logical high. The flip-flop FF is reset and the logic control signal CTRL is changed from logical high into logical low.

The structure of the pulse width increasing circuit 704 and the pulse width decreasing circuit 706 is substantially same with that shown in FIG. 3 and FIG. 5. The first driving circuit 705 comprises a delay circuit DL2 and a nor gate NOR1. As shown in FIG. 7, the clock signal CLK is sent into the flip-flop FF through a delay circuit DL1. The delay circuits DL1, DL2 and the nor gate NOR1 work together to generate the complementary driving signals DRV1 and DRV2 with sufficient dead time.

The second driving circuit 707 comprises a delay circuit DL3, a comparator COM4 and a nor gate NOR2. A threshold voltage VTH3 at the inverting input terminal of the comparator COM4 is set to be a little bit smaller than the threshold voltage VTH2. The delay circuits DL3, the comparator COM4 and the nor gate NOR2 work together to generate the complementary driving signals DRV3 and DRV4 with sufficient dead time.

Figure 8:
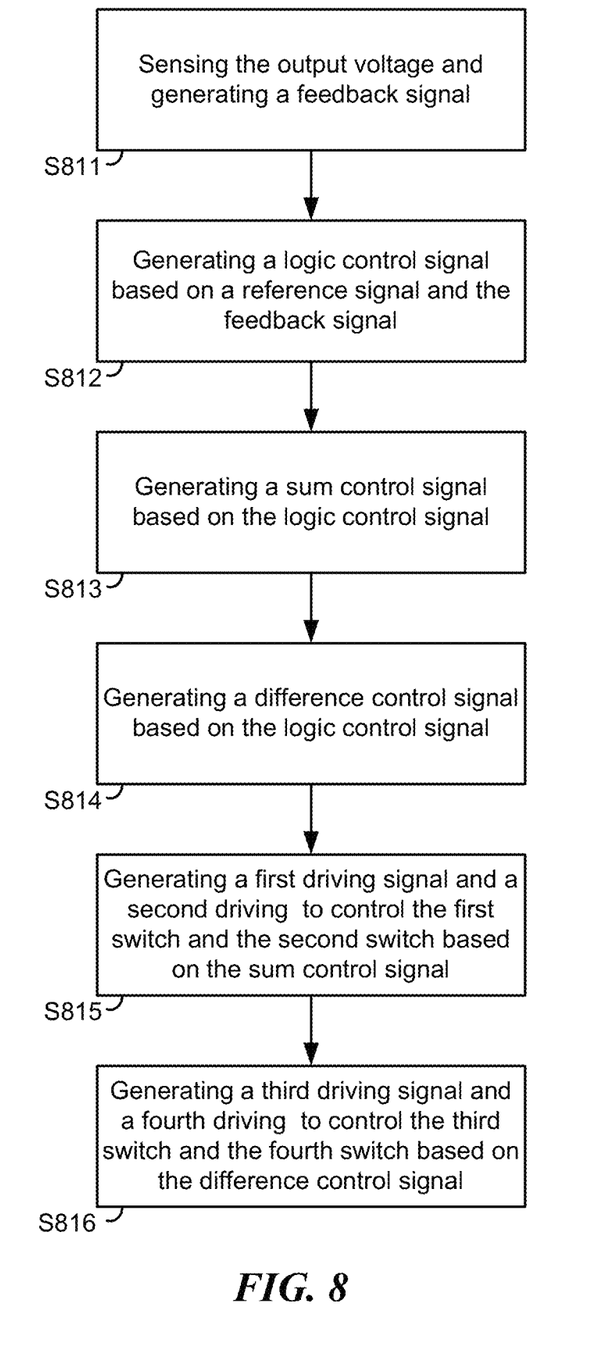
FIG. 8 is a working flowchart of a control method used in a buck-boost converter in accordance with an embodiment of the present invention.

FIG. 8 is a working flowchart of a control method used in a buck-boost converter in accordance with an embodiment of the present invention. It comprises steps S811~S816.

At the step S811, the output voltage is sensed and a feedback signal representative of the output voltage is generated.

At the step S812, a logic control signal is generated based on a reference signal and the feedback signal.

At the step S813, a sum control signal is generated based on the logic control signal, wherein the pulse width of the sum control signal is equal to the sum of a first predetermined value and the pulse width of the logic control signal.

At the step S814, a difference control signal is generated based on the logic control signal, wherein the pulse width of the difference control signal is equal to the difference between the pulse width of the logic control signal and a second predetermined value. In an embodiment, the first predetermined value and the second predetermined value are equal.

At the step S815, a first driving signal and a second driving signal are generated based on the sum control signal, so as to respectively control the first switch and the second switch. Generally, the first driving signal and the second driving signal are complementary with sufficient dead time.

At the step S816, a third driving signal and a fourth driving signal are generated based on the difference control signal, so as to respectively control the third switch and the fourth switch. Generally, the third driving signal and the fourth driving signal are complementary with sufficient dead time.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in a buck-boost converter, wherein the buck-boost converter converting an input voltage into an output voltage comprises a first switch, a second switch, a third switch, a fourth switch and an inductor, the controller comprises:
- a logic control circuit configured to generate a logic control signal based on a reference signal and a feedback signal representative of the output voltage;
- a pulse width increasing circuit coupled to the logic control circuit, wherein the pulse width increasing circuit is configured to generate a sum control signal based on the logic control signal, and wherein the pulse width increasing circuit increases the pulse width of the logic control signal by a first predetermined value to generate the pulse width of the sum control signal;
- a pulse width decreasing circuit coupled to the logic control circuit, wherein the pulse width decreasing circuit is configured to generate a difference control signal based on the logic control signal, and wherein the pulse width decreasing circuit decreases the pulse width of the logic control signal by a second predetermined value to generate the pulse width of the difference control signal;
- a first driving circuit coupled to the pulse width increasing circuit, wherein based on the sum control signal, the first driving circuit generates a first driving signal and a second driving signal to respectively control the first switch and the second switch; and
- a second driving circuit coupled to the pulse width decreasing circuit, wherein based on the difference control signal, the second driving circuit generates a third driving signal and a fourth driving signal to respectively control the third switch and the fourth switch.

2. The controller of claim 1, wherein the pulse width increasing circuit comprises:
- a first diode having an anode and a cathode, wherein the anode is coupled to the logic control circuit to receive the logic control signal;
- a first resistor having a first terminal and a second terminal, wherein the first terminal is coupled to the anode of the first diode, the second terminal is coupled to the cathode of the first diode;
- a first capacitor having a first terminal and a second terminal, wherein the first terminal is coupled to the cathode of the first diode, the second terminal is grounded; and
- a first comparator having a first input terminal, a second input terminal and an output terminal, wherein the first input terminal is coupled to the first terminal of the first capacitor, the second input terminal is configured to receive a first threshold voltage, and wherein the first comparator compares the voltage across the first capacitor with the first threshold voltage and generates the sum control signal at the output terminal.

3. The controller of claim 1, wherein the pulse width decreasing circuit comprises:
- a second diode having an anode and a cathode, wherein the cathode is coupled to the logic control circuit to receive the logic control signal;
- a second resistor having a first terminal and a second terminal, wherein the first terminal is coupled to the cathode of the second diode, the second terminal is coupled to the anode of the second diode;
- a second capacitor having a first terminal and a second terminal, wherein the first terminal is coupled to the anode of the second diode, the second terminal is grounded; and
- a second comparator having a first input terminal, a second input terminal and an output terminal, wherein the first input terminal is coupled to the first terminal of the second capacitor, the second input terminal is configured to receive a second threshold voltage, and wherein the second comparator compares the voltage across the second capacitor with the second threshold voltage and generates the difference control signal at the output terminal.

4. The controller of claim 1, wherein the logic control circuit comprises:
- an oscillator configured to generate a clock signal and a ramp signal;
- an error amplifier having a first input terminal, a second input terminal and an output terminal, wherein the first input terminal is configured to receive the reference signal, the second input terminal is configured to receive the feedback signal, and wherein based on the reference signal and the feedback signal, the error amplifier generates a compensation signal at the output terminal;
- an adder having a first input terminal, a second input terminal and an output terminal, wherein the first input terminal is coupled to the oscillator to receive the ramp signal, the second input terminal is configured to receive a current sensing signal representative of the current flowing through the inductor, and wherein the adder adds the ramp signal to the current sensing signal and generates a sum signal at the output terminal;
- a third comparator having a first input terminal, a second input terminal and an output terminal, wherein the first input terminal is coupled to the output terminal of the adder to receive the sum signal, the second input terminal is coupled to the output terminal of the error amplifier to receive the compensation signal, and wherein the third comparator compares the sum signal with the compensation signal and generates a reset signal at the output terminal; and
- a flip-flop having a first input terminal, a second input terminal and an output terminal, wherein the first input terminal is coupled to the oscillator to receive the clock signal, the second input terminal is coupled to the output terminal of the third comparator to receive the reset signal, and wherein based on the clock signal and the reset signal, the flip-flop generates the logic control signal at the output terminal.

5. The controller of claim 1, wherein the first predetermined value is equal to the second predetermined value.

6. The controller of claim 1, wherein the sum of the first predetermined value and the second predetermined value is smaller than the period of the logic control signal.

7. A buck-boost converter comprising:
- a first switch having a first terminal, a second terminal and a control terminal, wherein the first terminal is configured to receive an input voltage;
- a second switch having a first terminal, a second terminal and a control terminal, wherein the first terminal is coupled to the second terminal of the first switch, the second terminal is grounded;
- an inductor having a first terminal and a second terminal, wherein the first terminal is coupled to the second terminal of the first switch and the first terminal of the second switch;
- a third switch having a first terminal, a second terminal and a control terminal, wherein the first terminal is coupled to the second terminal of the inductor, the second terminal is grounded;

a fourth switch having a first terminal, a second terminal and a control terminal, wherein the first terminal is coupled to the second terminal of the inductor and the first terminal of the third switch, the second terminal is configured to provide an output voltage;

an output capacitor having a first terminal and a second terminal, wherein the first terminal is coupled to the second terminal of the fourth switch, the second switch is grounded;

a feedback circuit coupled to the second terminal of the fourth switch, wherein the feedback circuit is configured to generate a feedback signal representative of the output voltage;

a logic control circuit coupled to the feedback circuit, wherein the logic control circuit is configured to generate a logic control signal based on a reference signal and the feedback signal;

a pulse width increasing circuit coupled to the logic control circuit, wherein the pulse width increasing circuit is configured to generate a sum control signal based on the logic control signal, and wherein the pulse width increasing circuit increases the pulse width of the logic control signal by a first predetermined value to generate the pulse width of the sum control signal;

a pulse width decreasing circuit coupled to the logic control circuit, wherein the pulse width decreasing circuit is configured to generate a difference control signal based on the logic control signal, and wherein the pulse width decreasing circuit decreases the pulse width of the logic control signal by a second predetermined value to generate the pulse width of the difference control signal;

a first driving circuit coupled to the pulse width increasing circuit, wherein based on the sum control signal, the first driving circuit generates a first driving signal and a second driving signal to respectively control the first switch and the second switch; and a second driving circuit coupled to the pulse width decreasing circuit, wherein based on the difference control signal, the second driving circuit generates a third driving signal and a fourth driving signal to respectively control the third switch and the fourth switch.

8. The buck-boost converter of claim 7, wherein the pulse width increasing circuit comprises:

a first diode having an anode and a cathode, wherein the anode is coupled to the logic control circuit to receive the logic control signal;

a first resistor having a first terminal and a second terminal, wherein the first terminal is coupled to the anode of the first diode, the second terminal is coupled to the cathode of the first diode;

a first capacitor having a first terminal and a second terminal, wherein the first terminal is coupled to the cathode of the first diode, the second terminal is grounded; and a first comparator having a first input terminal, a second input terminal and an output terminal, wherein the first input terminal is coupled to the first terminal of the first capacitor, the second input terminal is configured to receive a first threshold voltage, and wherein the first comparator compares the voltage across the first capacitor with the first threshold voltage and generates the sum control signal at the output terminal.

9. The buck-boost converter of claim 7, wherein the pulse width decreasing circuit comprises:

a second diode having an anode and a cathode, wherein the cathode is coupled to the logic control circuit to receive the logic control signal;

a second resistor having a first terminal and a second terminal, wherein the first terminal is coupled to the cathode of the second diode, the second terminal is coupled to the anode of the second diode;

a second capacitor having a first terminal and a second terminal, wherein the first terminal is coupled to the anode of the second diode, the second terminal is grounded; and a second comparator having a first input terminal, a second input terminal and an output terminal, wherein the first input terminal is coupled to the first terminal of the second capacitor, the second input terminal is configured to receive a second threshold voltage, and wherein the second comparator compares the voltage across the second capacitor with the second threshold voltage and generates the difference control signal at the output terminal.

10. The buck-boost converter of claim 7, wherein the logic control circuit comprises:

an oscillator configured to generate a clock signal and a ramp signal;

an error amplifier having a first input terminal, a second input terminal and an output terminal, wherein the first input terminal is configured to receive the reference signal, the second input terminal is coupled to the feedback circuit to receive the feedback signal, and wherein based on the reference signal and the feedback signal, the error amplifier generates a compensation signal at the output terminal;

an adder having a first input terminal, a second input terminal and an output terminal, wherein the first input terminal is coupled to the oscillator to receive the ramp signal, the second input terminal is configured to receive a current sensing signal representative of the current flowing through the inductor, and wherein the adder adds the ramp signal to the current sensing signal and generates a sum signal at the output terminal;

a third comparator having a first input terminal, a second input terminal and an output terminal, wherein the first input terminal is coupled to the output terminal of the adder to receive the sum signal, the second input terminal is coupled to the output terminal of the error amplifier to receive the compensation signal, and wherein the third comparator compares the sum signal with the compensation signal and generates a reset signal at the output terminal; and a flip-flop having a first input terminal, a second input terminal and an output terminal, wherein the first input terminal is coupled to the oscillator to receive the clock signal, the second input terminal is coupled to the output terminal of the third comparator to receive the reset signal, and wherein based on the clock signal and the reset signal, the flip-flop generates the logic control signal at the output terminal.

11. The buck-boost converter of claim 7, wherein the first predetermined value is equal to the second predetermined value.

12. The buck-boost converter of claim 7, wherein the sum of the first predetermined value and the second predetermined value is smaller than the period of the logic control signal.

13. A control method of a buck-boost converter, wherein the buck-boost converter converting an input voltage into an output voltage comprises a first switch, a second switch, a third switch, a fourth switch and an inductor, the control method comprises:

sensing the output voltage and generating a feedback signal representative of the output voltage;

generating a logic control signal based on a reference signal and the feedback signal;

generating a sum control signal based on the logic control signal, wherein the pulse width of the sum control signal is equal to the sum of a first predetermined value and the pulse width of the logic control signal;

generating a difference control signal based on the logic control signal, wherein the pulse width of the difference control signal is equal to the difference between the pulse width of the logic control signal and a second predetermined value;

generating a first driving signal and a second driving signal based on the sum control signal to respectively control the first switch and the second switch;

generating a third driving signal and a fourth driving signal based on the difference control signal to respectively control the third switch and the fourth switch.

14. The control method of claim 13, wherein the step of generating the logic control signal comprises:

sensing the current flowing through the inductor and generating a current sensing signal;

generating a clock signal and a ramp signal;

generating a compensation signal based on the reference signal and the feedback signal;

adding the ramp signal to the current sensing signal to generate a sum signal;

comparing the sum signal with the compensation signal to generate a reset signal; and     generating a logic control signal based on the clock signal and the reset signal.

15. The control method of claim 13, wherein the first predetermined value is equal to the second predetermined value.

16. The control method of claim 13, wherein the sum of the first predetermined value and the second predetermined value is smaller than the period of the logic control signal.

* * * * *